Sept. 9, 1947.  H. SCHMITZ  2,427,308
ELECTRIC HOT WATER RADIATOR
Filed Aug. 25, 1945   2 Sheets-Sheet 1
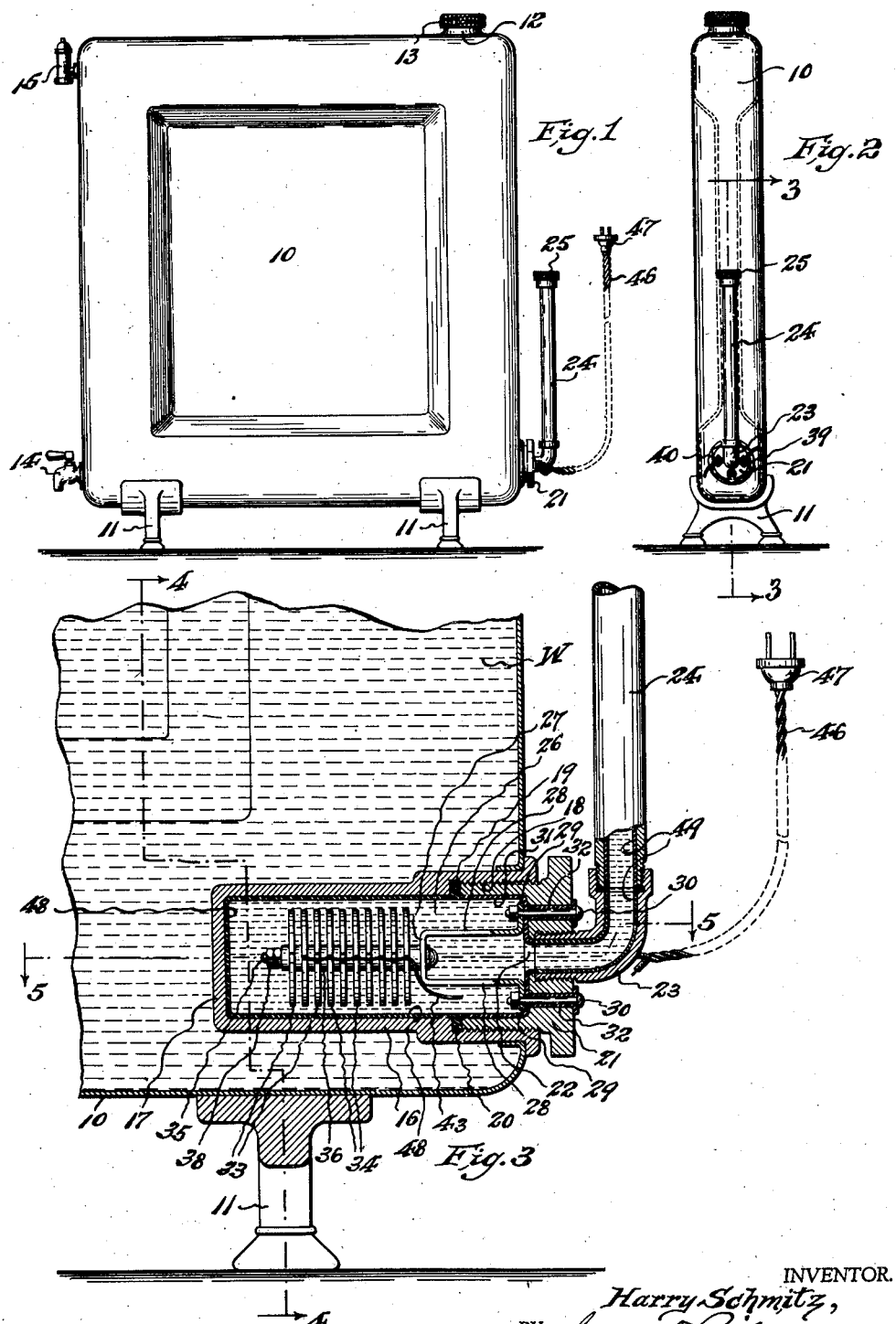
INVENTOR.
Harry Schmitz,
BY George D. Richards
Attorney Sept. 9, 1947.  H. SCHMITZ  2,427,308
ELECTRIC HOT WATER RADIATOR
Filed Aug. 25, 1945  2 Sheets-Sheet 2
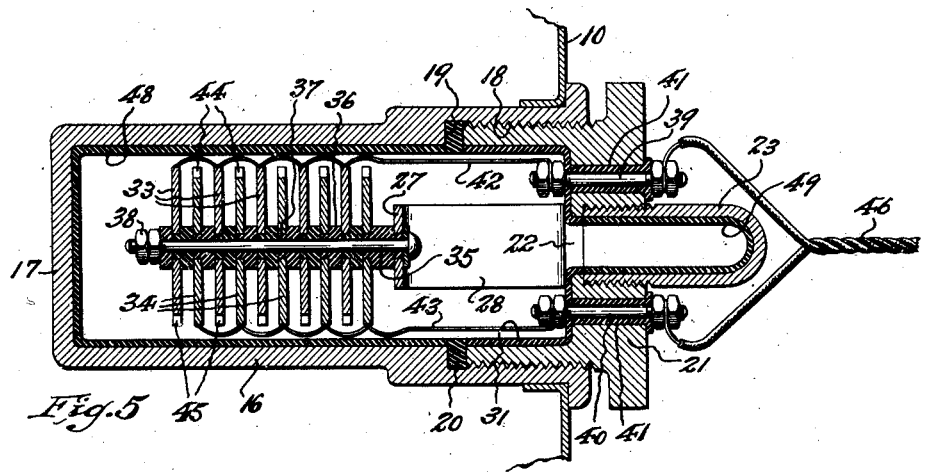
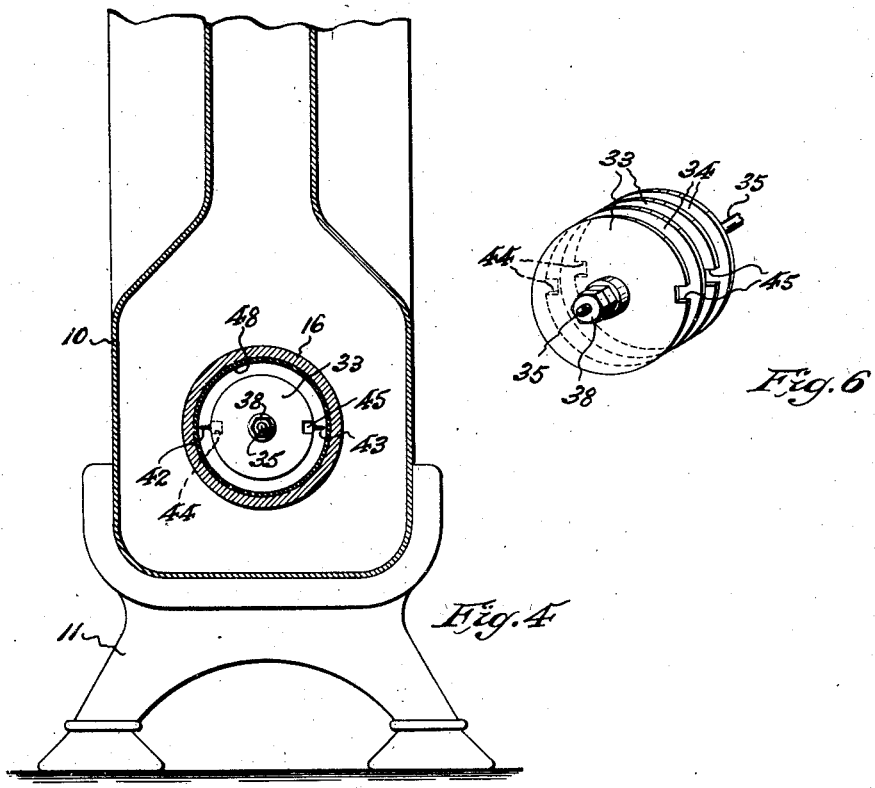
INVENTOR.
Harry Schmitz,
BY George S. Richards
Attorney Patented Sept. 9, 1947

2,427,308

UNITED STATES PATENT OFFICE 2,427,308

ELECTRIC HOT-WATER RADIATOR

Harry Schmitz, Brooklyn, N. Y.

Application August 25, 1945, Serial No. 612,652

2 Claims. (Cl. 219—38)

This invention relates to radiators for room heating; and the invention had reference, more particularly, to a novel construction of heating radiator of the hot water type provided with a self-contained electrical means for heating its water content.

This invention has for an object to provide a hot water heating radiator, which is preferably but not necessarily of portable character, whereby to be movable from place to place where its heating function is desired to be availed of, said radiator being equipped with a novel electrical heating means capable of being detachably connected with an outlet supplied with current from a power source, and said unit being adapted to generate heat for transfer to the water content with which the radiator body is supplied.

The invention has for another object to provide in combination with a radiator body, adapted to be supplied with a water content, a novel electrical heat generating means comprising a container adapted to be entered in the interior of the radiator body and adapted to be filled with a relatively small volume of liquid which is segregated thereby from the water content of said radiator body; said container having inserted therein and submerged in its liquid content a novel electrical heater unit for applying heat to its liquid content; and said liquid content and heater unit being electrically insulated from the container and the radiator body and the water contained in the latter.

Other objects of this invention, not at this time more particularly enumerated, will be understood from the following detailed description of the same.

An illustrative embodiment of this invention is shown in the accompanying drawings, in which:

Fig. 1 is a face elevational view of an electric hot water radiator according to this invention, and Fig. 2 is an end elevational view of the same, as viewed from the right in Fig. 1.

Fig. 3 is a fragmentary vertical sectional view, taken on line 3—3 in Fig. 2, but drawn on an enlarged scale; Fig. 4 is a transverse vertical sectional view, taken on line 4—4 in Fig. 3; Fig. 5 is a horizontal sectional view, taken on line 5—5 in Fig. 3; and Fig. 6 is a fragmentary perspective view of the electrode assembly of the novel electrical heater unit.

Similar characters of reference are employed in the above described views, to indicate corresponding parts.

Referring to the drawings, the reference character 10 indicates a hollow radiator body. This radiator body may be of any suitable external and internal design, and may be made of sheet or cast metal or any other material which is impervious to water but heat conductive. Said radiator body 10 is preferably provided at its bottom with suitably arranged and connected supporting legs 11; and preferably the radiator body is provided in the form of a portable structure capable of being readily moved from place to place where its heating function is desired to be availed of. Said hollow radiator body 10 is adapted to be substantially filled with water W, and to this end is provided at its top with a filling neck 12 normally closed by a detachable cap 13. At its bottom portion, said radiator body is provided with a drain cock 14, whereby its water content may be discharged when desired. Also connected with the top of said radiator body is a suitable pressure relief valve 15, whereby accumulation of excessive internal pressure within the radiator interior during operation thereof may be guarded against.

Affixed to the bottom portion of the radiator body 10, so as to penetrate the interior of said radiator body from one end thereof, is a container shell 16 having a closed inner end 17. Said container shell is welded or otherwise secured to the radiator body 10 so as to be unitary therewith, and so that its interior does not communicate with the interior of said radiator body. Said container shell 16 is preferably of cylindrical shape of suitable diameter so that its sides are spaced from the surrounding walls of the radiator body, and of suitable length so as to extend a substantial distance into the radiator body interior, but preferably of considerably less length than the length of said radiator body. The outer open end of said container shell 16 is provided with a diametrically enlarged, internally screw-threaded mouth portion 18, which terminates at its inner end in an annular shoulder 19 to seat a sealing washer 20 which is also of electrical insulating characteristics.

Removably threaded into the mouth portion 18 of said container shell 16 is a closure plug or bushing 21, the inner end of which engages the sealing washer 20 so as to effect a leak-tight joint between said closure plug or bushing 21 and said container shell 16. Said closure plug or bushing 21 is provided with an axial bore 22 which communicates with the interior of said container shell, and threaded into the outer end of said bore 22 is one end of an elbow connection 23, from the upstanding opposite or exterior end of which extends a perpendicular filling pipe 24. Said filling pipe 24 is thus disposed externally of the adjacent end of the radiator body 10, and its upper end is normally closed by a detachable cap 25. Said filling pipe 24, when the cap 25 is removed, is utilized to introduce into and fill the interior of the container shell 16 with a liquid 26, the temperature of which is subject to rise when an electric current is caused to pass therethrough, as and for the purposes subsequently to be more particularly referred to.

Carried by the closure plug or bushing 21, so as to extend axially therefrom into the interior of the container shell 16, and so as to be enveloped by the liquid 26 with which the latter is filled, is an electrical heater means. Said heater means is supported by a bracket yoke 27 having legs 28 which straddle the bore 22 of said closure plug or bushing 21. The legs 28 of said bracket yoke terminate in foot-pieces 29 which abut the closure plug or bushing wall; said foot pieces 29 being affixed to the closure plug or bushing 21 by suitable fastening means, such as the bolts 30. Said bracket yoke is electrically insulated from the closure plug or bushing 21 by an insulating lining or coating 31 which covers the interior surfaces of the latter, and so as to be interposed between the same and the bracket yoke foot pieces 29; and the fastening bolts 30 are also insulated from the plug or bushing by surrounding sleeves 32 of suitable insulating material.

The electric heater means is formed by a series of pairs of opposed spaced positive and negative electrodes which are adapted to be submerged in the liquid 26 with which the container shell 16 is filled, so that said liquid is interposed between and in contact with the opposed faces of said positive and negative electrodes, and thus subject to the flow of electric current therethrough from the one to the other of said electrodes.

In an illustrative embodiment of the electric heater means as shown, the positive electrodes 33, which are in the form of metallic discs of low conductive resistance, such e. g. as copper discs, are opposed to and spaced from the negative electrodes 34, which are also in the form of metallic discs of low conductive resistance, such e. g. as copper discs. A series of pairs of said positive and negative electrode discs 33 and 34 are mounted upon a support comprising a carrier rod 35, which is affixed to the bracket yoke 27 so as to extend therefrom axially within the interior of the container shell 16. The electrodes are both mechanically spaced apart and electrically insulated one from another by annular insulator blocks 36 having hub portions 37 of reduced diameter which engage through central receiving openings therefor with which the electrode discs are provided. Said insulator blocks 36 are supported by the carrier rod 35, and are suitably secured in assembled position thereon, as by keeper nuts 38 threaded onto the free end portion of said carrier rod.

To electrically connect said electrodes with an external circuit of a power source, the closure plug or bushing 21 is provided with suitable binding posts 39 and 40 extending through the end wall thereof. Said binding posts 39 and 40 are electrically insulated from the closure plug or bushing 21 by surrounding sleeves 41 of suitable insulating material, and by the insulating lining or coating 31 with which the interior surface of said closure plug or bushing 21 is covered. The positive electrode discs 33 are connected to the inner end of one binding post, as e. g. the binding post 39, by a conductor 42 which is suitably secured to the periphery of each said positive electrode disc 33. Similarly, the negative electrode discs 34 are connected to the inner end of the other binding post, viz. the binding post 40, by a conductor 43 which is suitably secured to the periphery of each said negative electrode disc 34. Where the conductor 42 serving the positive electrode disc 33 crosses the peripheries of the intervening negative electrode discs 34, the said peripheries of the latter are provided with indented clearance notches 44 which straddle the conductor 42, whereby to guard the latter against accidental contact with said negative electrode discs. In like manner, the positive electrode discs 33 are also provided with similar peripheral indenting notches 45 which straddle the conductor 43, whereby to guard the latter against accidental contact with said positive electrode discs. To the outer ends of said binding posts 39 and 40 are respectively connected the conductors of a cable or cord 46 of suitable length and provided at its end with a conventional main circuit outlet connector plug 47, whereby operating current may be supplied to said electric heater means of the radiator.

As already above mentioned, the interior surface of the closure plug or bushing 21 is covered with a lining or coating of electrical insulating material 31; in like manner, the interior surface of the container shell 16 is also covered with a lining or coating 48 of insulating material, and preferably the interior surfaces of the elbow 23 and filling pipe 24 are likewise covered with a lining or coating 49 of insulating material. By means of said lining or coatings 31, 48 and 49 external metal parts of the radiator are insulated against conduction of electrical current supplied to the heater means, and consequently both risk of electrical shock by contact with external parts of the radiator, and dissipation of current serving the heater means is avoided.

It will be obvious that the number of pairs of electrodes 33—34 with which the electrical heater means is provided is subject to variation according to the size and capacity of the radiator and the amount of heat desired to be generated. It will also be understood that the electrical circuit serving the heater means may include suitable automatic controls (not shown), such e. g. as a thermostatic control, current modifying rheostat means, etc., as will be well understood by those acquainted with the art.

In the use and operation of the radiator, the radiator body is supplied with a content of water W in amount adapted to leave some free space at the top thereof to allow for expansion when the water is heated. The container shell 16 is filled with the liquid 26, which may be water or other suitable liquid having a comparatively high coefficient of resistance to conduction of electric current therethrough. Thereafter, the cable or cord 46 is plugged into an electrical current supply outlet, whereupon current is supplied to the heater means of the radiator so that current is caused to flow between opposed faces of the pairs of electrode discs 33—34 through intervening layers of the liquid 26. Since the electrical resistance of said intervening layers of liquid 26 is substantially greater than that of the electrode discs, heat is generated so that the temperature of the liquid 26 rapidly rises, and since the volume of liquid 26 is relatively small, it has been found that elevated temperature thereof ranging between 140 to 180 degrees F. is quickly attained.

The heat thus generated in the liquid 26 is transferred through the walls of the container shell 16 to the larger mass of water W contained in the the radiator body 10, whereby convection currents are established which soon raises and maintains the temperature of the water W to a degree adequate for transfer through the radiator body walls for radiation therefrom with heating effect upon the surrounding air in the room or other place in which the radiator is located.

From the above it will be realized that the instant invention provides a very practical and efficient room heating radiator of the self-contained heat generating means type, which can be conveniently operated as a portable radiator capable of being moved to various locations where its heating function is desired to be availed of.

Having now described my invention, I claim:

1. An electric hot water radiator comprising a hollow radiator body adapted to be supplied with a water content, and electrical heat generating means comprising an outwardly open container affixed to the lower end of the radiator body so as to be immersed in the water content of said body, a detachable closure plug closing the open end of said container, said container being filled with a minor volume of liquid segregated by the container from the water content of said radiator body, an electrical heater unit comprising a plurality of pairs of spaced apart electrode plates, means extending axially inward from said closure plug for supporting said electrode plates immersed in the liquid content of said container, said supporting means including means to insulate said electrode plates one from another, said heater unit and closure plug constituting a unitary structure which can be removed from the container by detachment of the closure plug therefrom, said closure plug having binding post means extending therethrough but insulated therefrom, conductive means to connect alternate electrode plates through said binding posts to opposite sides of an electric current supply circuit, and said container and its closure plug having internal linings of electrical insulation material whereby to insulate the liquid content of the container from the radiator body and its water content.

2. An electric hot water radiator comprising a hollow radiator body adapted to be supplied with a water content, and electrical heat generating means comprising an outwardly open container affixed to the lower end of the radiator body so as to be immersed in the water content of said body, a detachable closure plug closing the open end of said container, said container being filled with a minor volume of liquid segregated by the container from the water content of said radiator body, an electrical heater unit comprising a plurality of pairs of spaced apart electrode plates, means extending axially inward from said closure plug for supporting said electrode plates immersed in the liquid content of said container, said supporting means including means to insulate said electrode plates one from another, said heater unit and closure plug constituting a unitary structure which can be removed from the container by detachment of the closure plug therefrom, said closure plug having binding post means extending therethrough but insulated therefrom, conductive means to connect alternate electrode plates through said binding posts to opposite sides of an electric current supply circuit, a filling means for said container extending through and exteriorly from said plug and externally of the radiator body, and said container, its closure plug and said filling means having internal linings of electrical insulation material whereby to insulate the liquid content of said container from the radiator body and its water content.

HARRY SCHMITZ.

REFERENCES CITED

The following references are of record in the file of this patent:

UNITED STATES PATENTS

| Number | Name | Date |
|---|---|---|
| 2,350,429 | Troupe | June 6, 1944 |
| 2,049,838 | Haussauer | Aug. 4, 1936 |
| 1,750,907 | Skold | Mar. 18, 1930 |
| 1,827,639 | Boschetti | Oct. 13, 1931 |
| 1,503,972 | Berg | Aug. 5, 1924 |

OTHER REFERENCES

C.-H. L. et al., "Jour. Sci. Inst.," May '44, page 88, 219-40.